(12) United States Patent
Cui (10) Patent No.: US 12,069,343 B2
(45) Date of Patent: Aug. 20, 2024

(54) METHOD AND APPARATUS FOR INTERACTION IN LIVE STREAMING ROOM, READABLE MEDIUM AND ELECTRONIC DEVICE

(71) Applicant: Beijing Bytedance Network Technology Co., Ltd., Beijing (CN)

(72) Inventor: Jin Cui, Beijing (CN)

(73) Assignee: Beijing Bytedance Network Technology Co., Ltd. (CN)

( * ) Notice: Subject to any disclaimer, the term of this patent is extended or adjusted under 35 U.S.C. 154(b) by 0 days.

(21) Appl. No.: 17/838,593

(22) Filed: Jun. 13, 2022

(65) Prior Publication Data

US 2022/0312078 A1 Sep. 29, 2022

Related U.S. Application Data (63) Continuation of application No. PCT/CN2020/128807, filed on Nov. 13, 2020.

(30) Foreign Application Priority Data

Jan. 3, 2020 (CN) .......................... 202010006089.8

(51) Int. Cl.
*H04N 21/4788* (2011.01)
*H04N 21/2187* (2011.01)

(52) U.S. Cl.
CPC ..... *H04N 21/4788* (2013.01); *H04N 21/2187* (2013.01)

(58) Field of Classification Search
CPC ......... H04N 21/43079; H04N 21/4788; H04N 21/4784; H04N 21/4312; H04N 21/4316;
(Continued)

(56) References Cited

U.S. PATENT DOCUMENTS 10,341,716 B2 7/2019 Peng
2014/0173121 A1 6/2014 Qiu
(Continued)

FOREIGN PATENT DOCUMENTS

CN 105828123 A 8/2016
CN 106028170 A 10/2016
(Continued)

OTHER PUBLICATIONS

Luo, "Design and implementation of an interactive live streaming platform for mobile," China Academic Journal Electronic Publishing House, https://kns.cnki.net/kcms/detail/detail.aspx?dbcode=CJFD&dbname=CJFDLAST2018&filename=WXXJ201810130&uniplatform=NZKPT&v=XJYUrH66_bZ0tNQJZT1Bzcod7xthINyr3_oN9S37_K7WrbXfci17GLK-7pw1h3DM, Oct. 15, 2018.
(Continued)

*Primary Examiner* — Ngoc K Vu (57) ABSTRACT

The present disclosure relates to a method and an apparatus for interaction in a live streaming room, a readable medium and an electronic device, including: receiving an interaction starting request sent by a client; determining an interaction activity duration corresponding to the interaction starting request; determining an interaction activity starting time and an interaction activity ending time according to the interaction activity duration, and sending the interaction activity starting time, the interaction activity ending time and a current time of a server to all clients in the live streaming room; and during the interaction activity, receiving interaction information sent by all the clients in the live streaming room, and sending the interaction information to all the clients in the live streaming room.

6 Claims, 7 Drawing Sheets

(58) Field of Classification Search
CPC .......... H04N 21/2187; H04N 21/4722; H04N 21/431; H04N 21/472; H04N 21/482; H04N 21/41407; H04N 21/26291; H04N 21/6582; H04N 21/84; H04N 21/8146; H04L 65/611; H04L 51/063; G06Q 30/0208; G06F 3/016

See application file for complete search history.

(56) References Cited

U.S. PATENT DOCUMENTS

| | | | |
|---|---|---|---|
| 2017/0048557 A1 | 2/2017 | Yu et al. | |
| 2018/0098028 A1* | 4/2018 | Mu | H04N 21/2187 |
| 2018/0270541 A1* | 9/2018 | Chen | H04N 21/482 |
| 2018/0336543 A1 | 11/2018 | Van Os et al. | |
| 2020/0194027 A1* | 6/2020 | Liang | G10L 25/48 |
| 2020/0391122 A1 | 12/2020 | Hamilton | A63F 13/5252 |
| 2021/0204001 A1* | 7/2021 | Xie | H04N 21/6405 |
| 2022/0070513 A1* | 3/2022 | Shirai | H04N 21/4312 |

FOREIGN PATENT DOCUMENTS

| | | |
|---|---|---|
| CN | 106131698 A | 11/2016 |
| CN | 106604100 A | 4/2017 |
| CN | 106937158 A | 7/2017 |
| CN | 107018441 A | 8/2017 |
| CN | 108322764 A | 7/2018 |
| CN | 108391157 A | 8/2018 |
| CN | 108471379 A | 8/2018 |
| CN | 108564416 A | 9/2018 |
| CN | 108810643 A | 11/2018 |
| CN | 108924661 A | 11/2018 |
| CN | 109218842 A | 1/2019 |
| CN | 109561351 A | 4/2019 |
| CN | 109698964 A | 4/2019 |
| CN | 110300307 A | 10/2019 |
| CN | 110602557 A | 12/2019 |
| CN | 111147885 A | 5/2020 |
| JP | 2014121610 A | 7/2014 |
| JP | 2017045425 A | 3/2017 |
| JP | 2018029325 A | 2/2018 |
| WO | 2017166517 A1 | 10/2017 |
| WO | 2018113405 A1 | 6/2018 |

OTHER PUBLICATIONS

International Search Report and Written Opinion issued Feb. 18, 2021 in International Application No. PCT/CN2020/128807.

First Office Action issued Sep. 16, 2020 in Chinese Patent Application No. 202010006089.8 (7 pages) with an English translation (6 pages).

Second Office Action issued Dec. 9, 2020 in Chinese Patent Application No. 202010006089.8 (9 pages) with an English translation (2 pages).

Notice of Allowance issued Mar. 10, 2021 in Chinese Patent Application No. 202010006089.8 (3 pages) with a English translation (2 pages).

Examination Report issued Sep. 22, 2022 in Indian Patent Application No. 202227033685, with English translation (5 pages).

Extended EP Search Report dated Feb. 17, 2023 in EP Appl. No. 20908837.6 (11 pages).

Written Decision on Registration issued Dec. 28, 2023 in KR Appl. No. 10-2022-7019637, English translation (5 pages).

Notice of Reasons for Refusal issued Jun. 20, 2023 in Japanese Application No. 2022-535891, with English translation (6 pages).

* cited by examiner

METHOD AND APPARATUS FOR INTERACTION IN LIVE STREAMING ROOM, READABLE MEDIUM AND ELECTRONIC DEVICE

CROSS-REFERENCES TO RELATED APPLICATIONS

The present disclosure is a continuation of International Application No. PCT/CN2020/128807, filed on Nov. 13, 2020, which claims priority to Chinese Patent Application No. 202010006089.8 and entitled "METHOD AND APPARATUS FOR INTERACTION IN LIVE STREAMING ROOM, READABLE MEDIUM AND ELECTRONIC DEVICE", filed with the CNIPA on Jan. 3, 2020. The contents of the aforementioned applications are hereby incorporated by reference in its entirety.

TECHNICAL FIELD

The present disclosure relates to the field of live streaming, and in particular to a method and an apparatus for interaction in a live streaming room, a readable medium and an electronic device.

BACKGROUND

In the prior art, when a viewer watches live streaming in a live streaming room, the viewer can interact with an anchor in the live streaming room in various ways, such as following, gifting, liking, etc., while the way of interaction between viewers in the live streaming room is relatively monotonous, which at present is only limited to chat interaction in text, and there is no other ways of interaction.

SUMMARY

The purpose of the present disclosure is to provide a method and an apparatus for interaction in a live streaming room, a readable medium and an electronic device, which determine an interaction activity duration when receiving an interaction starting request sent by any client in the live streaming room, and send interaction information received during the interaction activity to all clients in the live streaming room, the interaction activity in which all viewers can participate can be started in the live streaming room, and when an activity time of the interaction activity is controlled, the same starting time of the interaction activity can be ensured for all client viewers participating in the interaction activity in the live streaming room by means of issuing the time of the server to all the clients in the live streaming room, thereby ensuring the accuracy of activity data.

In a first aspect, the present disclosure provides a method for interaction in a live streaming room applied to a server, and the method includes:
  receiving an interaction starting request for starting an interaction activity sent by any client in the live streaming room;
  determining an interaction activity duration corresponding to the interaction starting request;
  determining an interaction activity starting time and an interaction activity ending time according to the interaction activity duration, and sending the interaction activity starting time, the interaction activity ending time and a current time of the server to all clients in the live streaming room; and during the interaction activity from the interaction activity starting time to the interaction activity ending time, receiving interaction information sent by all the clients in the live streaming room, and sending the interaction information to all the clients in the live streaming room.

Based on the above technical content, the interaction activity in which all viewers can participate can be started in the live streaming room, and when an activity time of the interaction activity is controlled, the same starting time of the interaction activity can be ensured for all the client viewers participating in the interaction activity in the live streaming room by means of issuing the time of the server to all the clients in the live streaming room, thereby ensuring the accuracy of activity data.

In an implementation, the receiving an interaction starting request for starting an interaction activity sent by any client in the live streaming room includes:
  receiving a first gifting request sent by any client in the live streaming room, where the first gifting request comprises a gift type sent by the client to an anchor and a gift number corresponding to the gift type;
  in a case that the gift type included in the first gifting request is a first preset type, determining the first gifting request as the interaction starting request of an interaction activity corresponding to the gift type.

By determining the first gifting request as the interaction starting request of the interaction activity corresponding to the gift type in the case that the gift type sent by the client to the anchor included in the first gifting request sent by any client in the live streaming room is the first preset type, further, a user can directly start the interaction activity in the live streaming room through a gifting operation, and gifting information in the gifting operation can be directly determined as interaction information in the interaction activity, thereby further facilitating the user in the live streaming room to start the interaction activity in the live streaming room.

In an implementation, the interaction information is a second gifting request including a gift type of a second preset type, and in a case that the second gifting request is received during the interaction activity, the method further includes:
  determining a solitaire length corresponding to the second gifting request according to the gift type included in the second gifting request and a gift number corresponding to the gift type; and
  determining a sum of solitaire lengths corresponding to all second gifting requests received during the interaction activity as a total solitaire length accumulated during the interaction activity; and
  the sending the interaction information to all the clients in the live streaming room includes:
  sending the total solitaire length to all the clients in the live streaming room.

The total solitaire length accumulated during the interaction activity is determined and sent to all clients in the live streaming room, thereby further improving the interactivity of the interaction activity in the live streaming room.

In an implementation, in the case that the second gifting request is received during the interaction activity, the method further includes:
  in a case that the gift type of a gift included in the second gifting request is determined to have a corresponding activity skill, performing an operation corresponding to the activity skill.

By performing an operation corresponding to the activity skill in the case that the gift type of the gift included in the second gifting request is determined to have a corresponding activity skill, whether the gift type of the gift included has a corresponding activity skill can be judged in the case that the second gifting request is received, and an corresponding operation can be performed on the current interaction activity in response to the activity skill. However, when an ordinary gifting request is received, that is, when the gift type of the gift included in the gifting request does not belong to a second preset type, this judgment is not made, so that a server load can be reduced to a certain extent.

In a second aspect, the present disclosure provides an apparatus for interaction in a live streaming room, the apparatus including:

a receiving module, configured to receive an interaction starting request for starting an interaction activity sent by any client in the live streaming room;

a first processing module, configured to determine an interaction activity duration corresponding to the interaction starting request;

a second processing module, configured to determine an interaction activity starting time and an interaction activity ending time according to the interaction activity duration, and send the interaction activity starting time, the interaction activity ending time and a current time of a server to all clients in the live streaming room; and a third processing module, configured to, during the interaction activity from the interaction activity starting time to the interaction activity ending time, receive interaction information sent by all the clients in the live streaming room, and send the interaction information to all the clients in the live streaming room.

In an implementation, the receiving module includes:

a first receiving sub-module, configured to receive a first gifting request sent by any client in the live streaming room, where the first gifting request includes a gift type sent by the client to an anchor and a gift number corresponding to the gift type;

a first processing sub-module, configured to determine the first gifting request as the interaction starting request of an interaction activity corresponding to the gift type in a case that the gift type included in the first gifting request is a first preset type.

In an implementation, the interaction information is a second gifting request including a gift type of a second preset type, and in a case that the second gifting request is received during the interaction activity, the apparatus further includes:

a fourth processing module, configured to determine a solitaire length corresponding to the second gifting request according to the gift type included in the second gifting request and a gift number corresponding to the gift type; and a fifth processing module, configured to determine a sum of solitaire lengths corresponding to all second gifting requests received during the interaction activity as a total solitaire length accumulated during the interaction activity; and the third processing module is further configured to send the total solitaire length to all the clients in the live streaming room.

In an implementation, in the case that the second gifting request is received during the interaction activity, the apparatus further includes:

a sixth processing module, configured to, in a case that the gift type of the gift included in the second gifting request is determined to have a corresponding activity skill, perform an operation corresponding to the activity skill.

In a third aspect, the present disclosure provides an electronic device including a processor and a memory; where, the memory is configured to store program code; and the processor is configured to call the program code stored in the memory to execute the method according to the first aspect.

In a fourth aspect, the present disclosure provides a computer-readable storage medium, where instructions are stored in the computer-readable storage medium, and when the instructions run on a computer, the computer is caused to execute the method according to the first aspect.

In a fifth aspect, the present disclosure provides a computer program, including program code, and when a computer runs the computer program, the program code executes the method according to the first aspect.

In combination with the above technical solutions, an interaction activity in which all viewers can participate can be started in a live streaming room according to the present disclosure, and when an activity time of the interaction activity is controlled, the same starting time of the interaction activity can be ensured for all client viewers participating in the interaction activity in the live streaming room by means of issuing the time of the server to all the clients in the live streaming room, thereby ensuring the accuracy of activity data.

In addition, by determining the first gifting request as the interaction starting request of the interaction activity corresponding to the gift type in the case that the gift type sent by the client to the anchor included in the first gifting request sent by any client in the live streaming room is the first preset type, further, a user can directly start the interaction activity in the live streaming room through a gifting operation, and gifting information in the gifting operation can be directly determined as interaction information in the interaction activity, thereby further facilitating the user in the live streaming room to start the interaction activity in the live streaming room.

In addition, by performing an operation corresponding to the activity skill in the case that the gift type of the gift included in the second gifting request is determined to have a corresponding activity skill, whether the gift type of the gift included has a corresponding activity skill can be judged in the case that the second gifting request is received, and a corresponding operation can be performed on the current interaction activity in response to the activity skill. However, when an ordinary gifting request is received, that is, when the gift type of the gift included in the gifting request does not belong to a second preset type, this judgment is not made, so that a server load can be reduced to a certain extent.

DESCRIPTION OF EMBODIMENTS

Embodiments of the present disclosure will be described in more detail below with reference to the accompanying drawings. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and complete understanding of the present disclosure. It should be understood that the drawings and embodiments of the present disclosure are only for illustrative purposes and are not intended to limit the protection scope of the present disclosure.

It should be understood that the steps recorded in method embodiments of the present disclosure may be performed in a different order and/or in parallel. Further, the method embodiments may include additional steps and/or omit to perform illustrated steps. The scope of the present disclosure is not limited in this regard.

The term "including" and its variants as used herein are open-ended inclusion, that is "including but not limited to". The term "based on" is "based at least in part on". The term "an embodiment" means "at least one embodiment"; the term "another embodiment" means "at least one other embodiment"; the term "some embodiments" means "at least some embodiments". Related definitions of other terms will be given in the following description.

It should be noted that the concepts of "first" and "second" mentioned in the present disclosure are only used to distinguish different apparatuses, modules or units, but are not used to limit the order or interdependence of the functions performed by these apparatuses, modules or units.

It should be noted that the modifications of "one" and "multiple" mentioned in the present disclosure are illustrative rather than limited, and those skilled in the art should understand that they should be understood as "one or multiple" unless otherwise clearly indicated in the context.

The names of messages or information exchanged between multiple apparatuses in the embodiments of the present disclosure are only used for illustrative purposes, and are not used to limit the scope of these messages or information.

Figure 1:
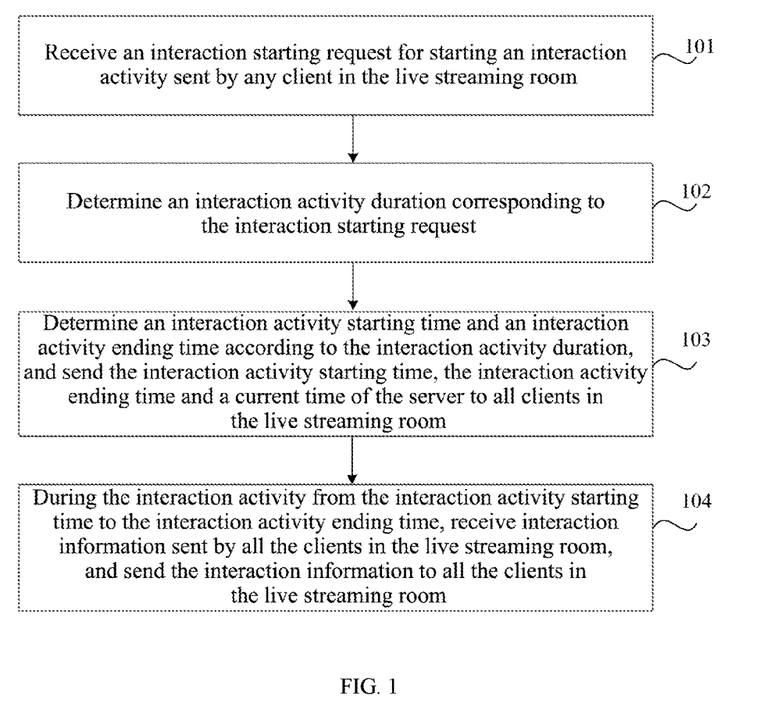
FIG. 1 is a flowchart of a method for interaction in a live streaming room according to an illustrative embodiment of the present disclosure.

FIG. 1 is a flowchart of a method for interaction in a live streaming room according to an illustrative embodiment of the present disclosure, the method is applied to a server. As shown in FIG. 1, the method includes steps 101 to 104.

In step 101, receive an interaction starting request for starting an interaction activity sent by any client in the live streaming room. The interaction starting request may be sent through clicking, by a user, a virtual button which is preconfigured in the client for starting an interaction activity, or may also be sent by sending a gift corresponding to a preset interaction activity, etc., which are, for example, as shown in FIGS. 2a and 2b.

Figure 2A:
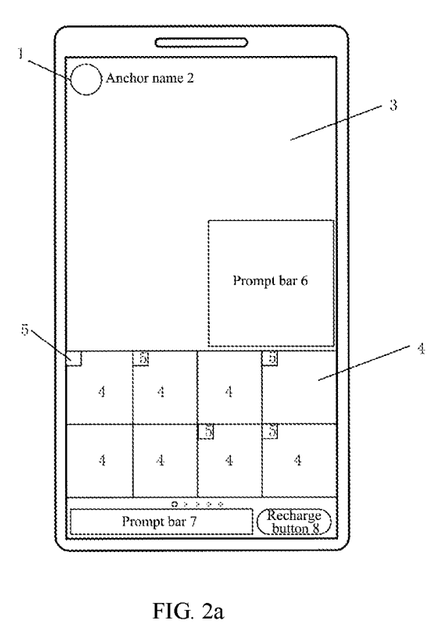
FIG. 2a is a display interface of a live streaming room when a user sends an interaction starting request according to an illustrative embodiment of the present disclosure.

FIG. 2a is a display interface of a live streaming room when a user sends an interaction starting request according to an illustrative embodiment of the present disclosure. In FIG. 2a, an anchor avatar 1 and an anchor name may be displayed at the top, and a list of gifts that can be given may be displayed at the bottom. The gift list is composed of multiple gift bars 4. A live screen display area 3 is used to display a current live screen. In addition to including the display area above the gift list as shown in FIG. 2a, the live screen display area 3 may also include an area for displaying the gift list. When the gift list is displayed, the gift list partially blocks the live screen display area 3. The gift bar 4 may also include a gift prompt box 5 covering a corner of the gift bar 4 to indicate whether the gift in the gift bar 4 can trigger an interaction activity and the interaction activity to be triggered after the gift in the gift bar 4 is sent. For example, "Solitaire" may be displayed in the gift prompt box 5 to prompt the user that the gift can start an interaction activity of gift solitaire after the gift is sent. A prompt bar 6 and a prompt bar 7 may be used to display instructions for some gifts or other prompt message contents about the live streaming room and the user itself. The prompt bar 6 is a prompt area covered on the live screen display area 3. If there's no prompt content displayed in the prompt bar 6, the live screen display area 3 will not be blocked. For example, when a user clicks any gift bar 4, if the gift bar 4 corresponds to a corresponding gift description, the gift description can be displayed in the prompt bar 6 or the prompt bar 7, or can also be displayed by covering other areas on the live screen display area 3, not limited to the prompt bar 6. The display interface of the live streaming room may also include a recharge button 8 for the user to recharge. In the display interface of the live streaming room as shown in FIG. 2a, the user may send the interaction starting request by clicking any gift bar 4 which has a gift prompt box 5 and which corresponds to a gift that can start an interaction activity as indicated in the gift prompt box 5, and sending the gift in the gift bar 4.

Figure 2B:
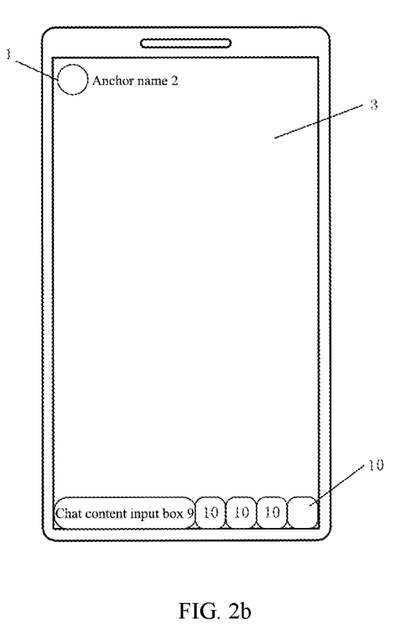
FIG. 2b is another display interface of a live streaming room when a user sends an interaction starting request according to an illustrative embodiment of the present disclosure.

FIG. 2b is another display interface of a live streaming room when a user sends an interaction starting request according to an illustrative embodiment of the present disclosure. In FIG. 2b, an anchor avatar 1 and an anchor name 2 of the live streaming room may also be displayed at the top, and a live content in the live streaming room is displayed in the live screen display area 3. Below the live screen display area 3, a chat content input box 9 may also be included for the user to input, in the live streaming room, chat content which can be viewed by all viewers in the live streaming room. One or multiple function items 10 may also be included to the right of the chat content input box 9. The function items 10 may correspond to different live streaming room functions, respectively. For example, a function item 10 may be set to correspond to a gift list, and a user can click the function item 10 to display the gifts, which can be sent in the current live streaming room, in the gift list as shown in FIG. 2a, and a function item 10 may also be set to correspond to a sharing function, and a user can share a current live streaming room by clicking the function item 10. In addition, a function item 10 may also be set to correspond to sending an interaction starting request, and when a user clicks the function item 10, the interaction starting request can be sent to the server, so as to start an interaction activity corresponding to the interaction starting request in the current live streaming room. In a case where there are multiple interaction activities, when a function item 10 is set to correspond to sending an interaction starting request, it is also necessary to set a specific interaction activity corresponding to the interaction starting request sent by the function item 10, so that the server can clearly know the interaction activity corresponding to the interaction starting request after receiving the interaction starting request.

The present disclosure does not limit the specific operation performed by a user on a client to send the interaction starting request received by the server. The above two methods for the user to send the interaction starting request on the client are only examples.

In step 102, determine an interaction activity duration corresponding to the interaction starting request. No matter how the user sends the interaction starting request to the server, the server will determine the interaction activity duration corresponding to the interaction starting request after receiving the interaction starting request. For example, if the interaction starting request corresponds to an interaction activity A, the interaction activity duration corresponding to the interaction activity A is determined after reception of the interaction starting request. If the interaction starting request corresponds to an interaction activity B, the interaction activity duration corresponding to the interaction activity B is determined after reception of the interaction starting request. A specific interaction activity corresponding to the interaction starting request is included in the interaction starting request, and after receiving the interaction starting request, the server can determine the interaction activity according to the request, then determine the interaction activity duration. The above interaction activity duration may be set in the server, or may be obtained by the server from another device according to the interaction activity corresponding to the interaction starting request after reception of the interaction starting request.

In step 103, determine an interaction activity starting time and an interaction activity ending time according to the interaction activity duration, and send the interaction activity starting time, the interaction activity ending time and a current time of a server to all clients in the live streaming room.

When the interaction activity starting time and the interaction activity ending time are determined according to the interaction activity duration, the determination is made according to a time in the server. For example, if the time when the interaction starting request is received is 16:12:05 on Dec. 2, 2019, and the interaction activity duration is 50 s, and according to a general setting, the server can start timing the interaction activity after 5 s from reception of the interaction starting request, then it can be determined that the interaction activity starting time is 16:12:10 on Dec. 2, 2019 and the interaction activity ending time is 16:13:00 on Dec. 2, 2019. In addition, the current time of the server, and the interaction activity starting time and the interaction activity ending time determined according to the time of the server are sent to the clients. In this way, the clients can determine when the interaction activity should actually start and end according to the received current time of the server, and thus the difference between interaction activity times displayed on different clients caused by the time difference between different clients can be avoided.

For example, if the time of a client in the live streaming room is 5 s slower than that of the server, if only the interaction activity starting time and the interaction activity ending time are sent to the client, the time information of the interaction activity displayed in the client will be 5s slower than that in the server. If the interaction activity duration is displayed in the client in a countdown manner, it will be caused that the interaction activity is displayed to have 5 s left in the client while the interaction activity has actually ended in the server, thus resulting in that an interaction operation performed by the user of the client within the last 5s as displayed in the client will not be recognized by the server as an interaction operation during the interaction activity.

In step 104, during the interaction activity from the interaction activity starting time to the interaction activity ending time, receive the interaction information sent by all clients in the live streaming room, and send the interaction information to all clients in the live streaming room. After the interaction activity starting time and the interaction activity ending time are aligned for all clients in the live streaming room, the interaction information related to the interaction activity sent by all clients in the live streaming room is received and forwarded to all clients in the live streaming room, so that during the interaction activity, all the clients in the live streaming room can know the progress of the interaction activity in time.

Through the above technical solutions, the interaction activity in which all viewers can participate can be started in the live streaming room, and when an activity time of the interaction activity is controlled, the same starting time of the interaction activity can be ensured for all client viewers participating in the interaction activity in the live streaming room by means of issuing the time of the server to all the clients in the live streaming room, thereby ensuring the accuracy of activity data.

Figure 3:
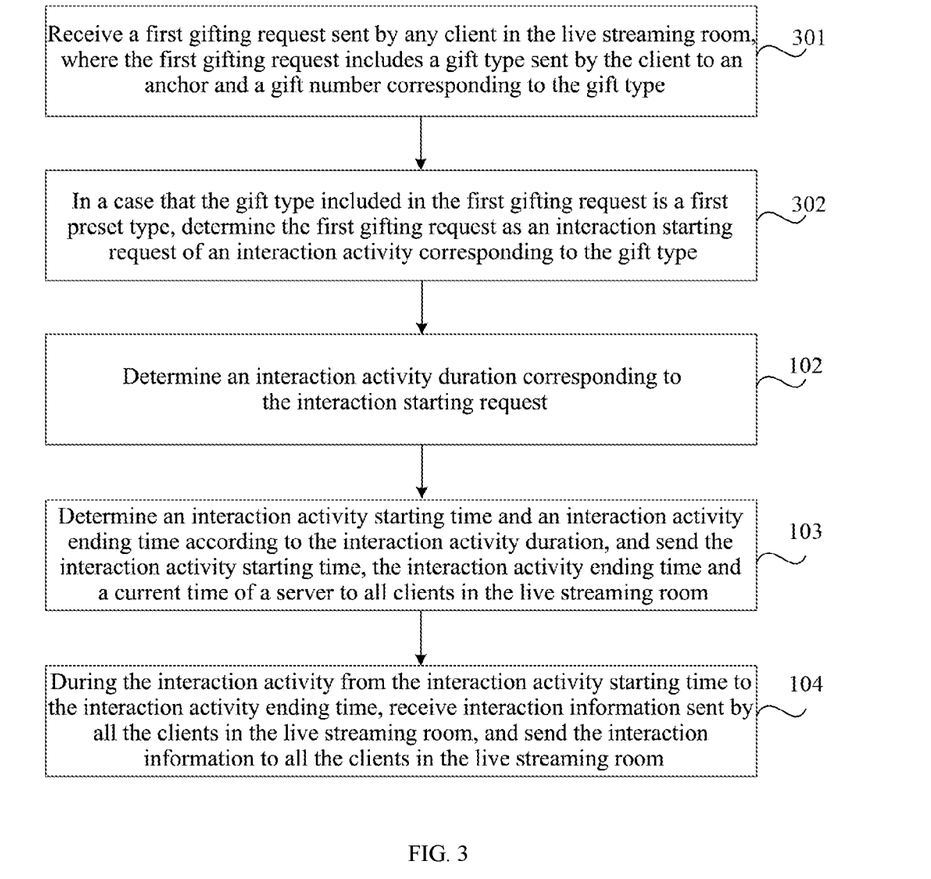
FIG. 3 is a flowchart of a method for interaction in a live streaming room according to another illustrative embodiment of the present disclosure.

FIG. 3 is a flowchart of a method for interaction in a live streaming room according to another illustrative embodiment of the present disclosure. As shown in FIG. 3, the method includes step 301 and step 302 in addition to step 102 to step 104 shown in FIG. 1.

In step 301, receive a first gifting request sent by any client in the live streaming room, where the first gifting request includes a gift type sent by the client to an anchor and a gift number corresponding to the gift type.

In step 302, in a case that the gift type included in the first gifting request is a first preset type, determine the first gifting request as an interaction starting request of an interaction activity corresponding to the gift type.

The above step 301 and step 302 can be steps corresponding to the sending the interaction starting request through the display interface of the live streaming room as shown in FIG. 2a. After a user performs a gifting operation on a gift marked to be able to trigger an interaction activity, the server will receive the first gifting request, and the first gifting request may include the gift type and the gift number corresponding to the gift type.

The first preset type is a gift type corresponding to an interaction activity. There may be one or multiple types of gifts belonging to the first preset type, and in a case that there are multiple interaction activities, the multiple types of gifts belonging to the first preset type may also correspond to different interaction activities, respectively.

After receiving the gifting request, if the server determines that the gift type belongs to the first preset type, that is, the gift type corresponding to the interaction activity, then the first gifting request is determined as the interaction starting request, and the corresponding interaction activity may be determined through the gift type in the first gifting request, so as to determine the interaction activity duration etc. Gifting information included in the first gifting request may also be sent to all clients in the live streaming room as the interaction information in the interaction activity.

Figure 4:
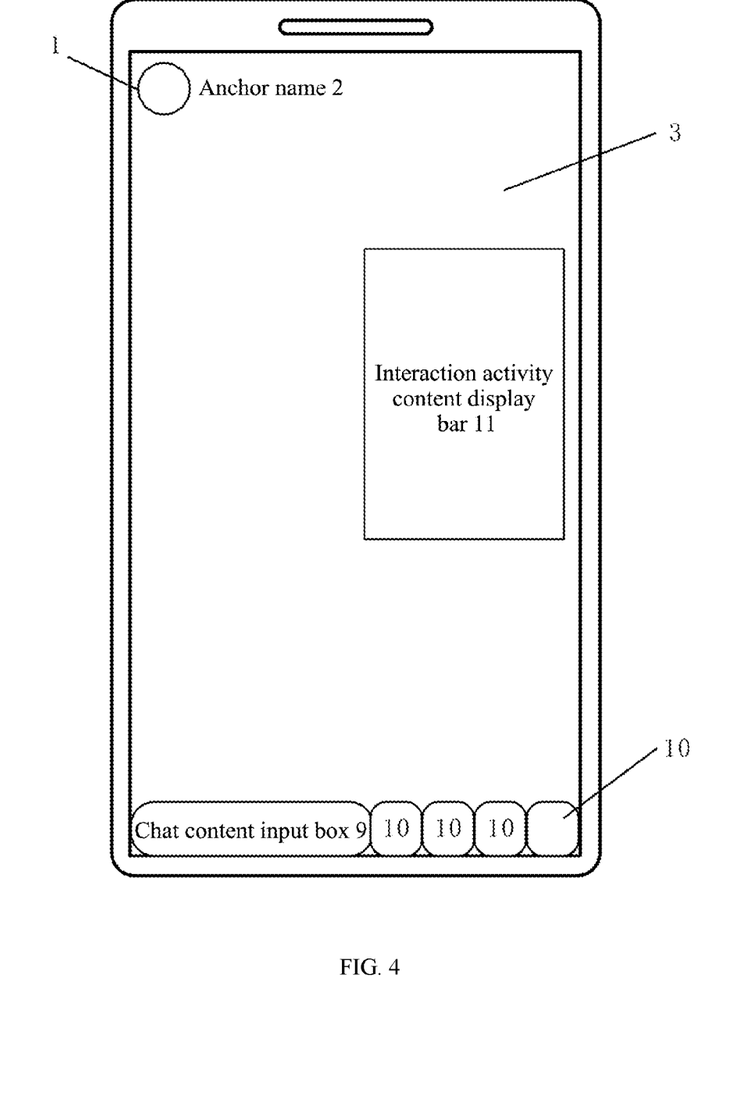
FIG. 4 is a schematic diagram of displaying interaction activity content in a live streaming room according to an illustrative embodiment of the present disclosure.

For example, there is a gift A related to a gift solitaire activity in the live streaming room. A user sends 10 gifts A to an anchor through a conventional gifting operation. The gifting operation is sent to the server as the first gifting request. After receiving the first gifting request, the server determines that the type of gift A included therein belongs to the first preset type, then the first gifting request is determined as an interaction starting request, and then an interaction activity duration of the gift solitaire activity is determined, and then an interaction activity starting time and an interaction activity ending time determined according to the duration of the gift solitaire, and a current time of the server are sent to all clients in the live streaming room. After receiving the interaction activity starting time, the interaction activity ending time and the current time of the server sent by the server, the clients in the live streaming room can display the interaction activity in the current live display interface according to a preset setting, as shown in FIG. 4. In FIG. 4, an interaction activity content display bar 11 is set to display the interaction activity, in which a name, an icon, a countdown, a real-time interaction progress, etc. of the interaction activity may be displayed. After sending the interaction activity starting time, the interaction activity ending time and the current time of the server to the clients in the live streaming room, the server will also send the gifting information included in the first gifting request to all clients in the live streaming room as the interaction information in the interaction activity, that is, the gift type included in the first gifting request and the gift number corresponding to the gift type.

Through the above technical solutions, a user can directly start an interaction activity in a live streaming room through a gifting operation, and gifting information in the gifting operation can be directly determined as interaction information in the interaction activity, thereby further facilitating the users in the live streaming room to start the interaction activity in the live streaming room.

Figure 5:
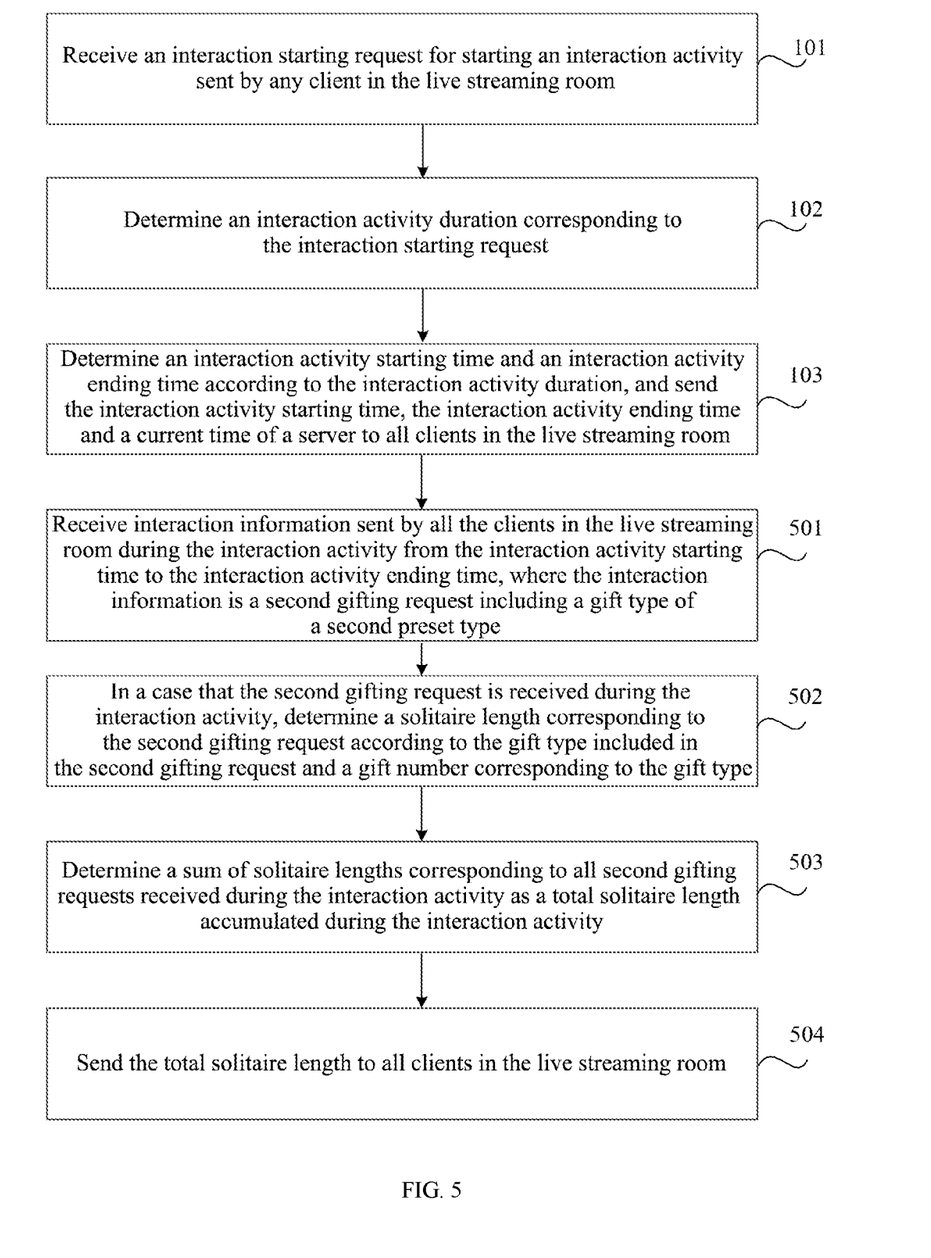
FIG. 5 is a flowchart of a method for interaction in a live streaming room when an interaction activity is gift solitaire according to another illustrative embodiment of the present disclosure.

FIG. 5 is a flowchart of a method for interaction in a live streaming room when an interaction activity is gift solitaire according to another illustrative embodiment of the present disclosure. Where, the interaction information is a second gifting request with the included gift type being a second preset type. In the case that the second gifting request is received during the interaction activity, as shown in FIG. 5, the method also includes step 501 to step 504 in addition to step 101 to step 103 as shown in FIG. 1.

In step 501, receive interaction information sent by all the clients in the live streaming room during the interaction activity from the interaction activity starting time to the interaction activity ending time, where the interaction information is a second gifting request including a gift type of a second preset type. The meaning of the second preset type is the same as that of the first preset type, both of which are gift types corresponding to an interaction activity. In the case that the interaction activity is triggered to be started by a user through a gifting operation, step 501 may also be to receive a second gifting request including a gift type of the first preset gift type sent by all clients in the live streaming room during the interaction activity from the interaction activity starting time to the interaction activity ending time. That is, during the interaction activity, the gifting request of gifts related to the interaction activity is received.

In step 502, in the case that the second gifting request is received during the interaction activity, determine a solitaire length corresponding to the second gifting request according to the gift type included in the second gifting request and a gift number corresponding to the gift type. In the case that the interaction activity is gift solitaire and the gifting request of a gift related to the interaction activity is received during the interaction activity, the solitaire length that needs be added in the interaction activity is determined according to the gifting request. For example, the solitaire length that can be added for each gift can be determined according to a value corresponding to the gift, or the solitaire length corresponding to each gift can be preset. When a gifting request related to a gift is received, the solitaire length corresponding to the gifting request can be determined directly according to the solitaire length corresponding to the gift included in the gifting request. For example, the gift type included in the second gifting request may be a gift B, the gift number corresponding to the gift B included in the second gifting request is 10, and the solitaire length corresponding to the gift B is 2, then the solitaire length corresponding to the second gifting request is 20.

In step 503, determine a sum of solitaire lengths corresponding to all second gifting requests received during the interaction activity as a total solitaire length accumulated during the interaction activity.

In step 504, send the total solitaire length to all clients in the live streaming room.

The server will add up the solitaire lengths corresponding to the second gifting requests received from all clients during the interaction activity, and every time a second gifting request is received, update the total solitaire length and send it to all clients in the live streaming room for displaying the total solitaire length. For example, the client may display the total solitaire length in the interaction activity content display bar 11 as shown in FIG. 4.

In a possible embodiment, when the second gifting request is received during the interaction activity, the method further includes: in a case that the gift type of the gift included in the second gifting request is determined to have a corresponding activity skill, performing an operation corresponding to the activity skill. The activity skill may be, for example, extending the interaction activity duration for a period of time, or doubling the solitaire length added in a period of time, etc., where an effect of extending the interaction activity duration may also be to freeze a countdown time of the current interaction activity for a period of time. When receiving the second gifting request, the server will determine whether the gift type of the gift included therein has a corresponding activity skill, and perform a corresponding operation on the current interaction activity in response to the activity skill. However, when an ordinary gifting request is received, that is, when the gift type of the gift included in the gifting request does not belong to the second preset type, this determination is not made, so that the server load can be reduced to a certain extent. Among them, the activity skill corresponding to the gift type may be preset, and the activity skill corresponding to each gift type may be displayed in the gifting interface of the client. As shown in FIG. 2a, the activity skill corresponding to a gift type may be displayed in the prompt bar 7 or prompt bar 6 after a user selects the gift bar.

Figure 6:
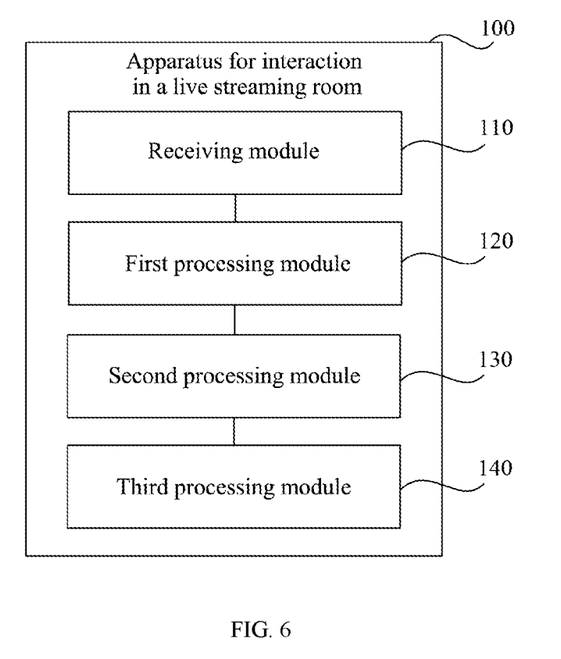
FIG. 6 is a structural block diagram of an apparatus for interaction in a live streaming room according to an illustrative embodiment of the present disclosure.

FIG. 6 is a structural block diagram of an apparatus 100 for interaction in a live streaming room shown according to an illustrative embodiment of the present disclosure, which is applied to a server. As shown in FIG. 6, the apparatus 100 includes: a receiving module 110, configured to receive an interaction starting request for starting an interaction activity sent by any client in the live streaming room; a first processing module 120, configured to determine an interaction activity duration corresponding to the interaction starting request; a second processing module 130, configured to determine an interaction activity starting time and an interaction activity ending time according to the interaction activity duration, and send the interaction activity starting time, the interaction activity ending time and a current time of a server to all clients in the live streaming room; a third processing module 140, configured to, during the interaction activity from the interaction activity starting time to the interaction activity ending time, receive interaction information sent by all the clients in the live streaming room, and send the interaction information to all the clients in the live streaming room.

Through the above technical solutions, an interaction activity in which all viewers can participate can be started in a live streaming room, and when an activity time of the interaction activity is controlled, the same starting time of the interaction activity can be ensured for all client viewers participating in the interaction activity in the live streaming room by means of issuing the time of the server to all the clients in the live streaming room, thereby ensuring the accuracy of activity data.

In a possible embodiment, the receiving module 110 includes: a first receiving sub-module, configured to receive a first gifting request sent by any client in the live streaming room, where the first gifting request includes a gift type sent by the client to an anchor and a gift number corresponding to the gift type; a first processing sub-module, configured to determine the first gifting request as the interaction starting request of an interaction activity corresponding to the gift type in a case that the gift type included in the first gifting request is a first preset type.

In a possible embodiment, the interaction information is a second gifting request including a gift type of a second preset type, and in a case that the second gifting request is received during the interaction activity, the apparatus 100 also includes: a fourth processing module, configured to determine a solitaire length corresponding to the second gifting request according to the gift type included in the second gifting request and a gift number corresponding to gift type; and a fifth processing module, configured to determine a sum of solitaire lengths corresponding to all second gifting requests received during the interaction activity as a total solitaire length accumulated during the interaction activity; and the third processing module is further configured to send the total solitaire length to all clients in the live streaming room.

In a possible embodiment, in the case that the second gifting request is received during the interaction activity, the apparatus further includes: a sixth processing module, configured to perform an operation corresponding to an activity skill in a case that it is determined that the gift type of a gift included in the second gifting request has a corresponding activity skill.

Figure 7:
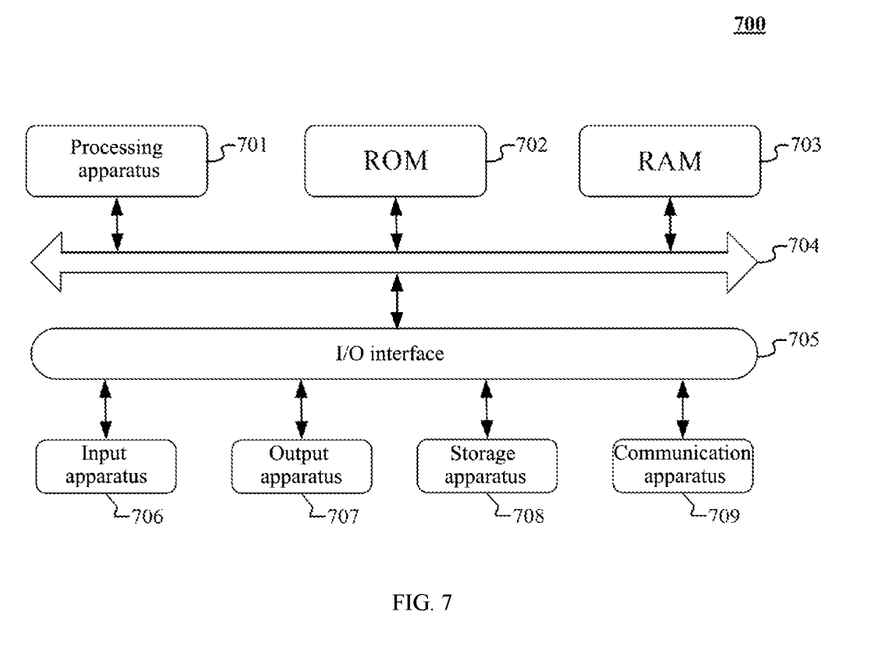
FIG. 7 is a schematic structural diagram of an electronic device suitable for implementing an embodiment of the present disclosure.

Referring now to FIG. 7, it shows a schematic structural diagram of an electronic device 700 suitable for implementing an embodiment of the present disclosure. The electronic device in the embodiment of the present disclosure may include, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (for example, a car navigation terminal), and a fixed terminal such as a digital TV, a desktop computer. The electronic device shown in FIG. 7 is only an example and should not impose any limitation on the function and scope of use of the embodiments of the present disclosure.

As shown in FIG. 7, the electronic device 700 may include a processing apparatus (such as a central processing unit, a graphics processor, etc.) 701, which may perform various appropriate actions and processes according to a program stored in a read-only memory (ROM) 702 or a program loaded from a storage apparatus 708 into a random-access memory (RAM) 703. In the RAM 703, various programs and data required for the operation of the electronic device 700 are also stored. The processing apparatus 701, the ROM 702 and the RAM 703 are connected to each other through a bus 704. An input/output (I/O) interface 705 is also connected to the bus 704.

Generally, the following apparatuses may be connected to the I/O interface 705: an input apparatus 706 including, for example, a touch screen, a touch pad, a keyboard, a mouse, a camera, a microphone, an accelerometer, a gyroscope, etc.; an output apparatus 707 including, for example, a liquid crystal display (LCD), a speaker, a vibrator, etc.; a storage apparatus 708 including, for example, a magnetic tape, a hard disk, etc.; and a communication apparatus 709. The communication apparatus 709 may allow the electronic device 700 to perform wireless or wired communication with other devices to exchange data. Although FIG. 7 shows an electronic device 700 having various apparatuses, it should be understood that it is not required to implement or have all of the illustrated apparatuses. More or fewer apparatuses may alternatively be implemented or provided.

In particular, according to an embodiment of the present disclosure, the process described above with reference to the flowchart may be implemented as a computer software program. For example, an embodiment of the present disclosure includes a computer program product including a computer program carried on a non-transitory computer-readable medium, the computer program includes program code for executing the method shown in the flowchart. In such an embodiment, the computer program may be downloaded and installed from a network through the communication apparatus 709, or installed from the storage apparatus 708, or installed from the ROM 702. When the computer program is executed by the processing apparatus 701, the above functions defined in the method of the embodiment of the present disclosure are executed.

It should be noted that the above computer-readable medium of the present disclosure may be a computer-readable signal medium or a computer-readable storage medium, or any combination of the above two. The computer-readable storage medium may be, for example, but is not limited to, an electrical, a magnetic, an optical, an electromagnetic, an infrared, or a semiconductor system, apparatus, or device, or any combination of the above. More specific examples of the computer-readable storage medium may include, but are not limited to, an electrical connection with one or more wires, a portable computer disk, a hard disk, a random-access memory (RAM), a read-only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium containing or storing a program, and the program may be used by or in combination with an instruction execution system, apparatus or device. In the present disclosure, the computer-readable signal medium may include a data signal propagated in a baseband or as a part of a carrier wave, in which computer-readable program code is carried. This propagated data signal may take many forms, including but not limited to an electromagnetic signal, an optical signal or any suitable combination of the above. The computer-readable signal medium may also be any computer-readable medium other than the computer-readable storage medium, the computer-readable signal medium may send, propagate, or transmit a program for use by or in combination with an instruction execution system, apparatus, or device. The program code contained on the computer-readable medium may be transmitted with any suitable medium, including but not limited to: a wire, an optical cable, a RF (radio frequency), etc., or any suitable combination of the above.

In some embodiments, the client and server may communicate using any currently known or future developed network protocol such as HTTP (HyperText Transfer Protocol), and may be interconnected with any form or medium of digital data communication (for example, communication network). Examples of the communication network include a local area network ("LAN"), a wide area network ("WAN"), the Internet (for example, the Internet), and an end-to-end network (for example, an ad hoc end-to-end network), as well as any currently known or future developed network.

The above computer-readable medium may be included in the above electronic device; it may also exist alone without being assembled into the electronic device.

The computer-readable medium carries one or more programs. When the one or more programs are executed by the electronic device, the electronic device is caused to: receive an interaction starting request for starting an interaction activity sent by any client in the live streaming room; determine an interaction activity duration corresponding to the interaction starting request; determine an interaction activity starting time and an interaction activity ending time according to the interaction activity duration, and send the interaction activity starting time, the interaction activity ending time and a current time of a server to all clients in the live streaming room; and during the interaction activity from the interaction activity starting time to the interaction activity ending time, receive interaction information sent by all the clients in the live streaming room, and send the interaction information to all the clients in the live streaming room.

Computer program code for performing the operations of the present disclosure may be written in one or more programming languages or a combination thereof, the programming languages include but not limited to object-oriented programming languages such as Java, Smalltalk, C++, as well as conventional procedural programming languages such as "C" language or similar programming languages. The program code can be executed completely on a user computer, partly executed on a user computer, executed as an independent software package, partly executed on a user computer, partly executed on a remote computer, or completely executed on a remote computer or server. In the case of involving a remote computer, the remote computer may be connected to the user computer through any kind of network, including a local area network (LAN) or a wide area network (WAN), or may be connected to an external computer (for example, using an Internet service provider to connect via the Internet).

The flowcharts and block diagrams in the accompanying drawings illustrate the possible implementation architecture, functions and operations of systems, methods and computer program products according to various embodiments of the present disclosure. In this regard, each block in a flowchart or block diagram may represent a module, program segment, or part of code that contains one or more executable instructions for implementing a specified logical function. It should also be noted that in some alternative implementations, the functions marked in the block may also occur in a different order than those marked in the drawings. For example, two blocks represented successively may actually be executed basically in parallel, and they may sometimes be executed in a reverse order, depending on the function involved. It should also be noted that each block in the block diagram and/or flowchart and the combination of blocks in the block diagram and/or flowchart may be implemented by a dedicated hardware based system that performs specified functions or operations, or implemented by a combination of dedicated hardware and computer instructions.

Involved modules described in the embodiments of the present disclosure may be implemented in software or in hardware. Among them, a name of a module does not constitute a limitation on the module itself under certain circumstances. For example, the receiving module may also be described as "a module that receives an interaction starting request for starting an interaction activity sent by any client in the live streaming room".

The functions described above herein may be performed at least in part by one or more hardware logic components. For example, without limitation, illustrative types of hardware logic component that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium, which may contain or store a program for use by or in combination with an instruction execution system, apparatus or device. The machine-readable medium may be a machine-readable signal medium or a machine-readable storage medium. The machine-readable medium may include, but is not limited to, an electronic, magnetic, an optical, an electromagnetic, infrared, or a semiconductor system, apparatus or device, or any suitable combination of the above. More specific examples of the machine-readable storage medium will include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to one or more embodiments of the present disclosure, example 1 provides a method for interaction in a live streaming room applied to a server, the method including:
  receiving an interaction starting request for starting an interaction activity sent by any client in the live streaming room;
  determining an interaction activity duration corresponding to the interaction starting request;
  determining an interaction activity starting time and an interaction activity ending time according to the interaction activity duration, and sending the interaction activity starting time, the interaction activity ending time and a current time of the server to all clients in the live streaming room; and
  during the interaction activity from the interaction activity starting time to the interaction activity ending time, receiving interaction information sent by all the clients in the live streaming room, and sending the interaction information to all the clients in the live streaming room.

According to one or more embodiments of the present disclosure, example 2 provides a method of example 1, the receiving an interaction starting request for starting an interaction activity sent by any client in the live streaming room includes:

receiving a first gifting request sent by any client in the live streaming room, where the first gifting request includes a gift type sent by the client to an anchor and a gift number corresponding to the gift type; and in a case that the gift type included in the first gifting request is a first preset type, determining the first gifting request as the interaction starting request of an interaction activity corresponding to the gift type.

According to one or more embodiments of the present disclosure, example 3 provides a method of example 1 or example 2, the interaction information is a second gifting request including a gift type of a second preset type, and in a case that the second gifting request is received during the interaction activity, the method further includes:

determining a solitaire length corresponding to the second gifting request according to the gift type included in the second gifting request and a gift number corresponding to the gift type; and determining a sum of solitaire lengths corresponding to all second gifting requests received during the interaction activity as a total solitaire length accumulated during the interaction activity; and the sending the interaction information to all clients in the live streaming room includes:

sending the total solitaire length to all clients in the live streaming room.

According to one or more embodiments of the present disclosure, example 4 provides a method of example 3, and in the case that the second gifting request is received during the interaction activity, the method further includes:

in the case that the gift type of a gift included in the second gifting request is determined to have a corresponding activity skill, performing an operation corresponding to the activity skill.

According to one or more embodiments of the present disclosure, example 5 provides an apparatus for interaction in a live streaming room applied to a server, the apparatus including:

a receiving module, configured to receive an interaction starting request for starting an interaction activity sent by any client in the live streaming room;

a first processing module, configured to determine an interaction activity duration corresponding to the interaction starting request;

a second processing module, configured to determine an interaction activity starting time and an interaction activity ending time according to the interaction activity duration, and send the interaction activity starting time, the interaction activity ending time and a current time of a server to all clients in the live streaming room; and a third processing module, configured to, during the interaction activity from the interaction activity starting time to the interaction activity ending time, receive interaction information sent by all the clients in the live streaming room, and send the interaction information to all the clients in the live streaming room.

According to one or more embodiments of the present disclosure, example 6 provides an apparatus of example 5, the receiving module including:

a first receiving sub-module, configured to receive a first gifting request sent by any client in the live streaming room, where the first gifting request includes a gift type sent by the client to an anchor and a gift number corresponding to the gift type; and a first processing sub-module, configured to determine the first gifting request as the interaction starting request of an interaction activity corresponding to the gift type in a case that the gift type included in the first gifting request is a first preset type.

According to one or more embodiments of the present disclosure, example 7 provides an apparatus of example 5 or example 6, the interaction information is a second gifting request including a gift type of a second preset type, and in a case that the second gifting request is received during the interaction activity, the apparatus further includes:

a fourth processing module, configured to determine a solitaire length corresponding to the second gifting request according to the gift type included in the second gifting request and a gift number corresponding to the gift type; and a fifth processing module, configured to determine a sum of solitaire lengths corresponding to all second gifting requests received during the interaction activity as a total solitaire length accumulated during the interaction activity; and the third processing module is further configured to send the total solitaire length to all the clients in the live streaming room.

According to one or more embodiments of the present disclosure, example 8 provides an apparatus of example 7, and in the case that the second gifting request is received during the interaction activity, the apparatus further includes:

a sixth processing module configured to, in a case that the gift type of a gift included in the second gifting request is determined to have a corresponding activity skill, perform an operation corresponding to the activity skill.

According to one or more embodiments of the present disclosure, example 9 provides a computer-readable medium having a computer program stored thereon, and when the program is executed by a processing apparatus, the steps of the method described in any one of examples 1-4 are implemented.

According to one or more embodiments of the present disclosure, example 10 provides an electronic device, including: a storage apparatus on which a computer program is stored; a processing apparatus, configured to execute the computer program in the storage device to implement the steps of the method according to any one of examples 1-4.

According to one or more embodiments of the present disclosure, there is also provided a computer program including program code. When a computer runs the computer program, the program code executes the steps of the method described in any one of examples 1-4.

The above description is only preferred embodiments of the present disclosure and a description of the applied technical principles. Those skilled in the art should understand that the disclosure scope involved in this disclosure is not limited to the technical solutions formed by the specific combination of the above technical features, but also covers other technical solutions formed by arbitrary combinations of the above technical features or equivalent features without departing from the above disclosed concept. For example, a technical solution formed by replacing the above features with the technical features having similar functions disclosed (but not limited to) in the present disclosure.

In addition, although the operations are described in a specific order, this should not be understood as requiring these operations to be performed in the specific order shown or in a sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to structural features and/or logical actions of method, it should be understood that the subject matter defined in the appended claims is not limited to the specific features or actions described above. On the contrary, the specific features and actions described above are only illustrative forms of implementing the claims. As for the apparatuses in the above embodiments, the specific mode in which each module performs operation has been described in detail in the embodiments of the method, which will not be described in detail here.

What is claimed is:

1. A method for interaction in a live streaming room, applied to a server, the method comprising:
   receiving an interaction starting request for starting an interaction activity sent by any client in the live streaming room;
   determining an interaction activity duration corresponding to the interaction starting request;
   determining an interaction activity starting time and an interaction activity ending time according to the interaction activity duration, and sending the interaction activity starting time, the interaction activity ending time and a current time of the server to all clients in the live streaming room; and
   during the interaction activity from the interaction activity starting time to the interaction activity ending time, receiving interaction information sent by at least one client in the live streaming room, and sending the interaction information to all clients in the live streaming room,
   wherein the interaction information is a second gifting request comprising a gift type of a second preset type, and in a case that the second gifting request is received during the interaction activity, the method further comprises:
      determining a gift sequence length corresponding to the second gifting request according to the gift type comprised in the second gifting request and a gift number corresponding to the gift type; and
      determining a sum of gift sequence lengths corresponding to all second gifting requests received during the interaction activity as a total gift sequence length accumulated during the interaction activity; and
   the sending the interaction information to all clients in the live streaming room comprises:
      sending the total gift sequence length to all the clients in the live streaming room,
      wherein in the case that the second gifting request is received during the interaction activity, the method further comprises:
         in a case that the gift type of a gift comprised in the second gifting request is determined to have a corresponding activity skill, performing an operation corresponding to the activity skill, wherein the activity skill comprises extending the interaction activity duration for a period of time, or doubling a gift sequence length added in a period of time.

2. The method according to claim 1, wherein the receiving an interaction starting request for starting an interaction activity sent by any client in the live streaming room comprises:
   receiving a first gifting request sent by any client in the live streaming room, wherein the first gifting request comprises a gift type sent by the client to an anchor and a gift number corresponding to the gift type; and
   in a case that the gift type comprised in the first gifting request is a first preset type, determining the first gifting request as the interaction starting request of an interaction activity corresponding to the gift type.

3. An apparatus for interaction in a live streaming room, comprising: a processor and a memory; wherein,
   the memory is configured to store program code; and
   the processor, when calling the program code stored in the memory, is configured to:
   receive an interaction starting request for starting an interaction activity sent by any client in the live streaming room;
   determine an interaction activity duration corresponding to the interaction starting request;
   determine an interaction activity starting time and an interaction activity ending time according to the interaction activity duration, and send the interaction activity starting time, the interaction activity ending time and a current time of a server to all clients in the live streaming room; and
   during the interaction activity from the interaction activity starting time to the interaction activity ending time, receive interaction information sent by at least one client in the live streaming room, and send the interaction information to all clients in the live streaming room,
   wherein the interaction information is a second gifting request comprising a gift type of a second preset type, and in a case that the second gifting request is received during the interaction activity, the processor is further configured to:
      determine a gift sequence length corresponding to the second gifting request according to the gift type comprised in the second gifting request and a gift number corresponding to the gift type;
      determine a sum of gift sequence lengths corresponding to all second gifting requests received during the interaction activity as a total gift sequence length accumulated during the interaction activity; and
      send the total gift sequence length to all the clients in the live streaming room,
      wherein in the case that the second gifting request is received during the interaction activity, the processor is further configured to:
         in a case that the gift type of a gift comprised in the second gifting request is determined to have a corresponding activity skill, perform an operation corresponding to the activity skill, wherein the activity skill comprises extending the interaction activity duration for a period of time, or doubling a gift sequence length added in a period of time.

4. The apparatus according to claim 3, wherein the processor is configured to:
receive a first gifting request sent by any client in the live streaming room, wherein the first gifting request comprises a gift type sent by the client to an anchor and a gift number corresponding to the gift type; and
determine the first gifting request as the interaction starting request of an interaction activity corresponding to the gift type in a case that the gift type comprised in the first gifting request is a first preset type.

5. A non-transitory computer-readable storage medium, wherein instructions are stored in the computer-readable storage medium, and when the instructions run on a computer, the computer is caused to execute following operations:
receiving an interaction starting request for starting an interaction activity sent by any client in the live streaming room;
determining an interaction activity duration corresponding to the interaction starting request;
determining an interaction activity starting time and an interaction activity ending time according to the interaction activity duration, and sending the interaction activity starting time, the interaction activity ending time and a current time of the server to all clients in the live streaming room; and
during the interaction activity from the interaction activity starting time to the interaction activity ending time, receiving interaction information sent by at least one client in the live streaming room, and sending the interaction information to all clients in the live streaming room,
wherein the interaction information is a second gifting request comprising a gift type of a second preset type, and in a case that the second gifting request is received during the interaction activity, the computer is further caused to execute following operations:
determining a gift sequence length corresponding to the second gifting request according to the gift type comprised in the second gifting request and a gift number corresponding to the gift type; and
determining a sum of gift sequence lengths corresponding to all second gifting requests received during the interaction activity as a total gift sequence length accumulated during the interaction activity, and
the sending the interaction information to all clients in the live streaming room comprises:
sending the total gift sequence length to all the clients in the live streaming room,
wherein in the case that the second gifting request is received during the interaction activity, the computer is further caused to execute following operations:
in a case that the gift type of a gift comprised in the second gifting request is determined to have a corresponding activity skill, performing an operation corresponding to the activity skill, wherein the activity skill comprises extending the interaction activity duration for a period of time, or doubling a gift sequence length added in a period of time.

6. The storage medium according to claim 5, wherein the computer is caused to execute following operations:
receiving a first gifting request sent by any client in the live streaming room, wherein the first gifting request comprises a gift type sent by the client to an anchor and a gift number corresponding to the gift type; and
in a case that the gift type comprised in the first gifting request is a first preset type, determining the first gifting request as the interaction starting request of an interaction activity corresponding to the gift type.

* * * * *